April 11, 1961 B. P. BAKER 2,979,589

CIRCUIT INTERRUPTERS

Filed April 9, 1956 8 Sheets-Sheet 1

WITNESSES
Edwin E. Bassler
W. R. Crout

INVENTOR
Benjamin P. Baker
BY
Ralph H. Swingle
ATTORNEY

CIRCUIT INTERRUPTERS

Filed April 9, 1956

8 Sheets-Sheet 3

April 11, 1961 B. P. BAKER 2,979,589

CIRCUIT INTERRUPTERS

Filed April 9, 1956 8 Sheets-Sheet 7

United States Patent Office 2,979,589

Patented Apr. 11, 1961

2,979,589

CIRCUIT INTERRUPTERS

Benjamin P. Baker, Turtle Creek, Pa., assignor to Westinghouse Electric Corporation, East Pittsburgh, Pa., a corporation of Pennsylvania Filed Apr. 9, 1956, Ser. No. 576,876

22 Claims. (Cl. 200—145)

This invention relates to circuit interrupters in general, and, in particular, to improved interrupting and arc-extinguishing structures therefor.

A general object of the invention is to provide an improved circuit interrupter particularly adapted for interrupting leading currents, such as the currents associated with shunt capacitor banks, and which will also have considerable fault-interrupting ability.

In United States patent application filed May 26, 1954, Serial No. 432,466, now United States Patent 2,806,110, issued September 10, 1957, to Winthrop M. Leeds, entitled "Circuit Interrupters," and assigned to the assignee of the instant application, there are disclosed novel circuit interrupters particularly adapted for interrupting currents associated with the switching of shunt capacitor banks. As set forth diagrammatically in said patent, the use of such capacitor banks, and the switching thereof, not only assists in improving the power factor associated with the transmission system, but such use also improves the voltage regulation.

In United States Patent application filed April 15, 1955, Serial No. 501,535, now United States Patent 2,809,259, issued October 8, 1957, to Benjamin P. Baker, Charles F. Cromer and Joseph Sucha, there are disclosed circuit interrupters of the general type illustrated in the Leeds patent but constituting considerable improvements thereover, to render the circuit interrupters suitable for interrupting fault currents of considerable kva. It is a general object of the present invention to further improve upon these types of structures, and to enable the same to interrupt fault currents associated with inductive circuits of considerably greater magnitude than otherwise possible.

A further object of the present invention is to associate one or more pressure-generating chambers with the contact structure so as to enable the pressure generated at one break to force fluid under pressure toward the other break within the pressure-generating chamber to more quickly bring about circuit interruption.

A further object of the present invention is to provide a piston arrangement in conjunction with one or more pressure-generating chambers of the foregoing type so as to facilitate low-current interruption.

Still another object of the present invention is to provide a generally tubular interrupting structure readily adaptable for conversion into one or more pressure-generating chambers so that high current magnitudes may readily be interrupted.

Still a further object of the present invention is to provide an improved interrupting structure of the type involving a pair of serially related interrupting breaks within a pressure-generating chamber.

Still a further object of the present invention is to provide a multibreak interrupting structure involving one or more relatively isolated breaks disposed in electrical series with one or more pressure-generating chambers having at least a pair of serially related breaks disposed within each pressure-generating chamber.

Still a further object of the present invention is to provide an improved arc-extinguishing unit in which is disposed a pair of serially related breaks, and wherein an arcing horn construction is utilized to facilitate the lengthening of the pressure-generating arc at one of the breaks.

Still a further object of the invention is to associate additional magnetic structure with the arcing horn arrangement set out in the preceding paragraph.

A further object of the present invention is to provide a generally sealed-casing type of interrupting structure involving a plurality of serially related breaks and preferably employing a suitable arc-extinguishing gas, such as sulfur hexafluoride, or related gases, in which a rotary movable contact assemblage is employed in conjunction with a tubular interrupting structure, the latter providing one or more isolated breaks and in addition thereto one or more pressure-generating chambers, each of which encloses a pair of serially related breaks.

Further objects and advantages will readily become apparent upon reading the following specification, taken in conjunction with the drawings, in which:

Figures 1 and 2 collectively show a substantially vertical cross-sectional view through a circuit interrupter involving the principles of the invention, the contact structure being illustrated in the closed-circuit position;

Figure 1:
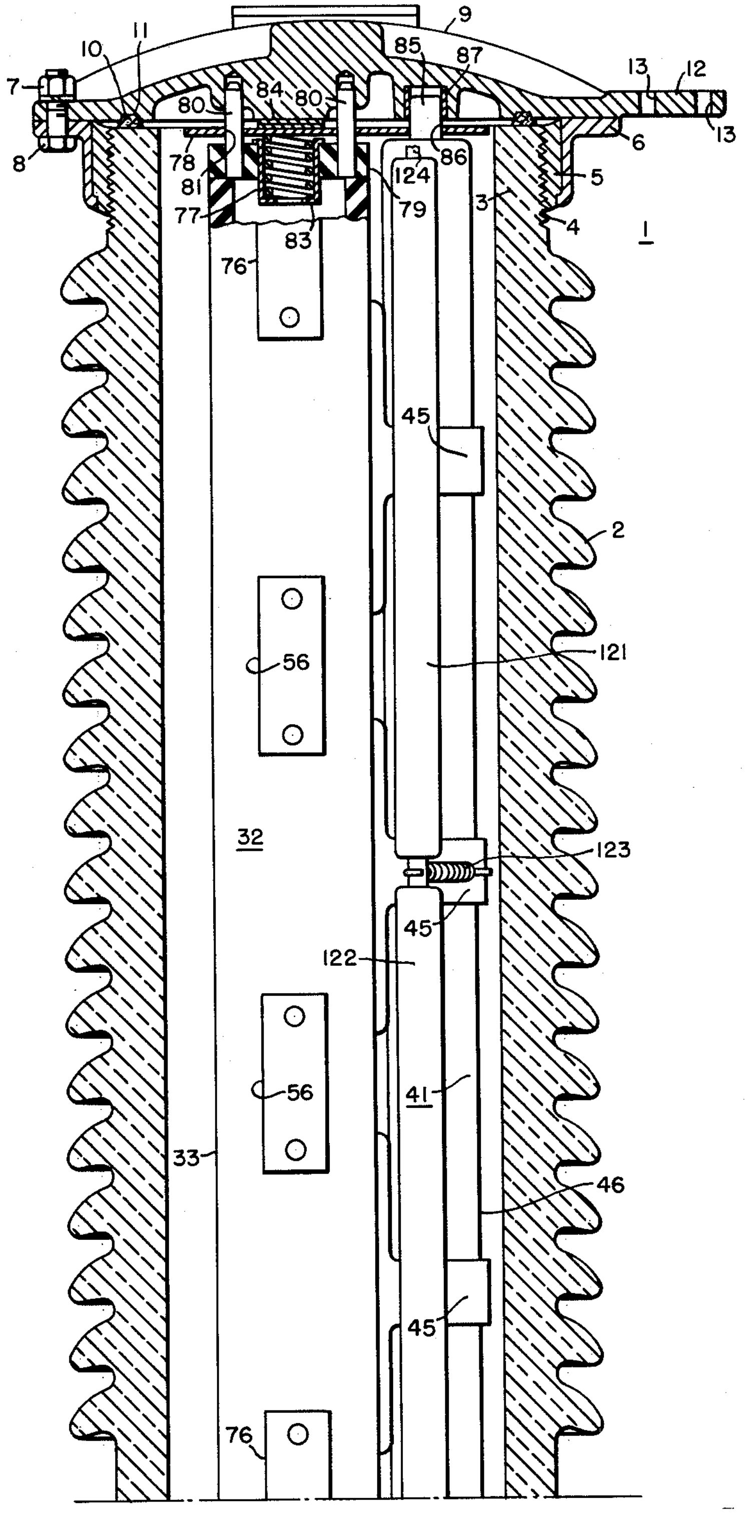
Figure 2:
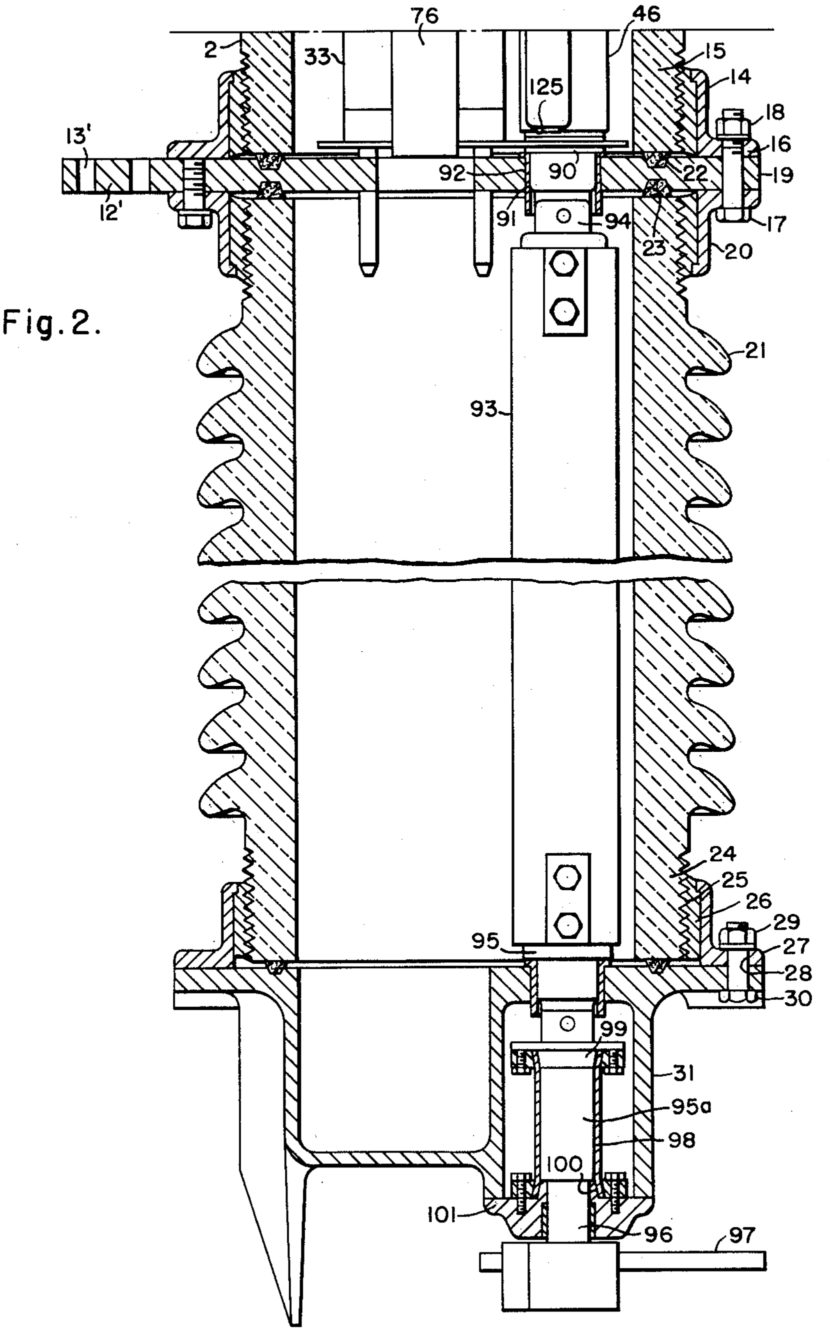

Referring to the drawings, and more particularly to Figs. 1 and 2 thereof, it will be observed that the reference numeral 1 designates a circuit interrupter involving a ceramic or porcelain casing 2 preferably supported in a vertical position as shown. It is to be clearly understood, however, that although the circuit interrupter 1 is illustrated in an upstanding, vertical position, nevertheless it could be disposed in a horizontal position, or any other position, as desired. By providing it in a vertical position less floor space is utilized.

Disposed at the upper end 3 of the casing 2 are a plurality of corrugations 4, which, in conjunction with a suitable cement 5, secure a mounting flange 6 fixedly in place. The mounting flange 6 has a plurality of nuts 7 and bolts 8 which rigidly secure a top casting cover 9 thereto in a gas-tight manner as illustrated. To assist in providing a sealed construction a suitable gasket 10 is disposed in an annular groove 11 provided on the lower face of the cover casting 9, and which is clamped against the upper end of the casing 2, as clearly shown in Fig. 1.

The top casting 9 has a laterally jutting terminal plate portion 12 with apertures 13 to which a suitable line connection may be made.

Disposed at the lower end of the porcelain casing 2 is another mounting flange ring 14, which is cemented to the lower end 15 of the casing 2 in a similar manner and has a plurality of peripherally disposed apertures 16 therethrough, which accommodate bolts 17 and nuts 18, the latter serving to clamp an intermediate casting plate 19 in position and also a flange ring 20 associated with a lower porcelain casing 21. The plate 19 includes the terminal portion 12′ having apertures 13′ to which the other line connection is to be made.

As shown more clearly in Fig. 2 of the drawings, gaskets 22, 23 are provided to bring about a sealed construction. At the lower end 24 of the porcelain casing 21 are provided additional corrugations 25, which, in conjunction with cement 26 mount a flange ring 27 fixedly in position. The flange ring 27 has a plurality of peripherally positioned mounting apertures 28 therethrough. Nuts 29 and bolts 30 fixedly secure the flange ring 27 and hence the casings 2, 21 to a lower support casting 31, the latter being additionally supported in any suitable manner.

Figures 3, 4, 5:
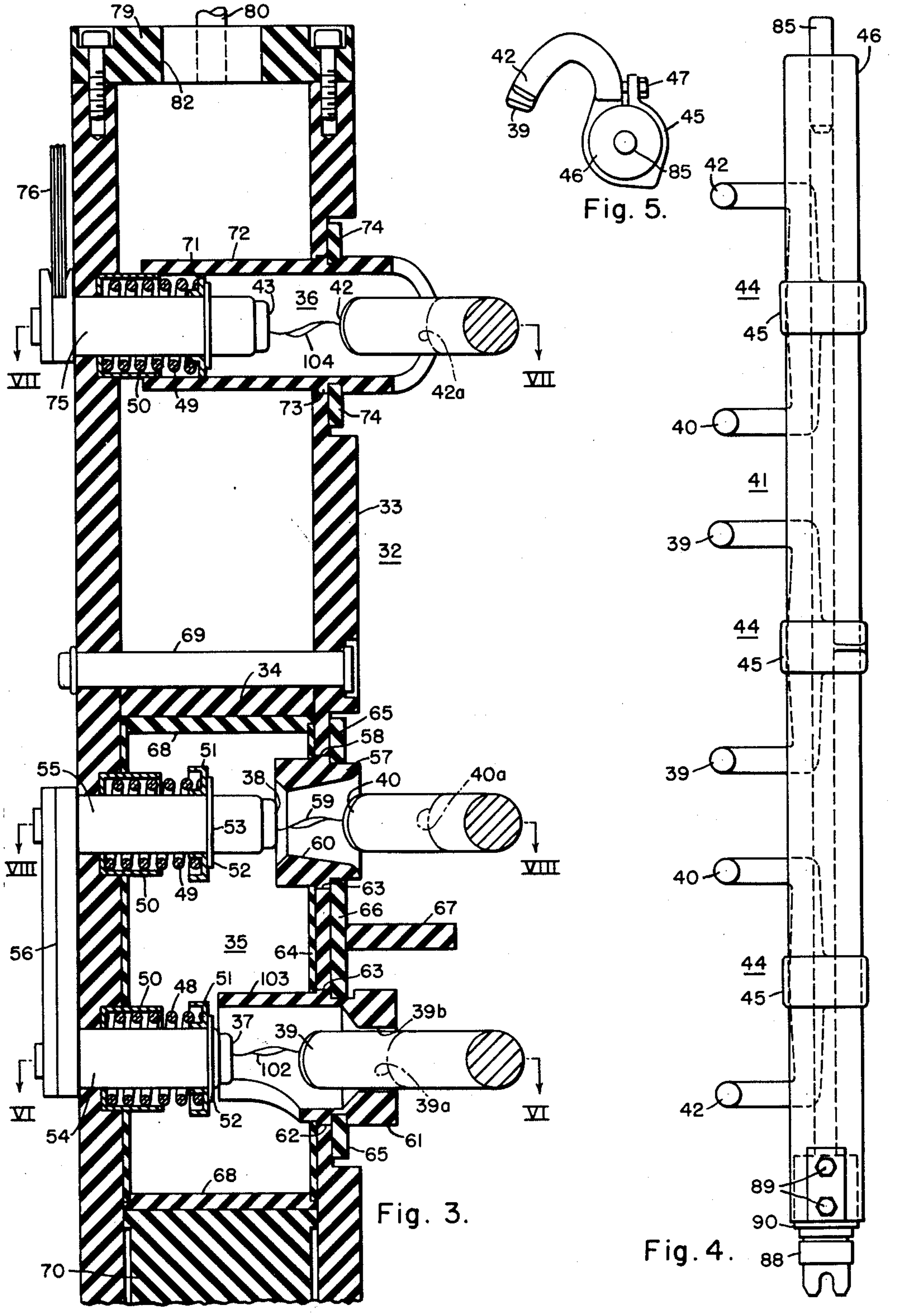
Fig. 3 is an enlarged vertical sectional view taken fragmentarily through the upper end of the tubular interrupting structure utilized in the interrupter of Figs. 1 and 2, the contact structure being illustrated in the partially open-circuit position.
Fig. 4 is a side elevational view of the rotary movable contact assemblage illustrating the plurality of spaced U-shaped movable bridging contacts.
Fig. 5 is a top plan view of the movable contact assemblage of Fig. 4.

Disposed within the upper porcelain casing 2 is a tubular interrupting assemblage, generally designated by the reference numeral 32, and having a construction more clearly evident from an inspection of Fig. 3 of the drawings. As noted here, it will be observed that the tubular interrupting assembly 32 includes a suitably configured insulating tube 33 having a plurality of partitions or plugs 34 therein which serve to generally divide the interior of the interrupting assembly 32 into pressure-generating chambers 35 and relatively isolated end chambers 36. As indicated in Fig. 3, and as illustrated in Figs. 1 and 2, actually there are provided two pressure-generating chambers 35 and two end chambers 36. Each pressure-generating chamber 35 encloses a relatively stationary pressure-generating contact 37 and a relatively stationary interrupting contact 38. Cooperating with these two relatively stationary contacts 37, 38 are a movable rotary pressure-generating contact 39 and a movable rotary interrupting contact 40. As indicated in Fig. 4 of the drawings, which illustrates a side elevational view of the entire rotary movable contact assemblage, there are two movable pressure-generating contacts 39 and two movable interrupting contacts 40. At the upper and lower ends of the movable rotary contact assemblage 41, as illustrated in Fig. 4, are additional end contacts 42, which make separating engagement with relatively stationary end contacts 43.

Figures 6, 15:
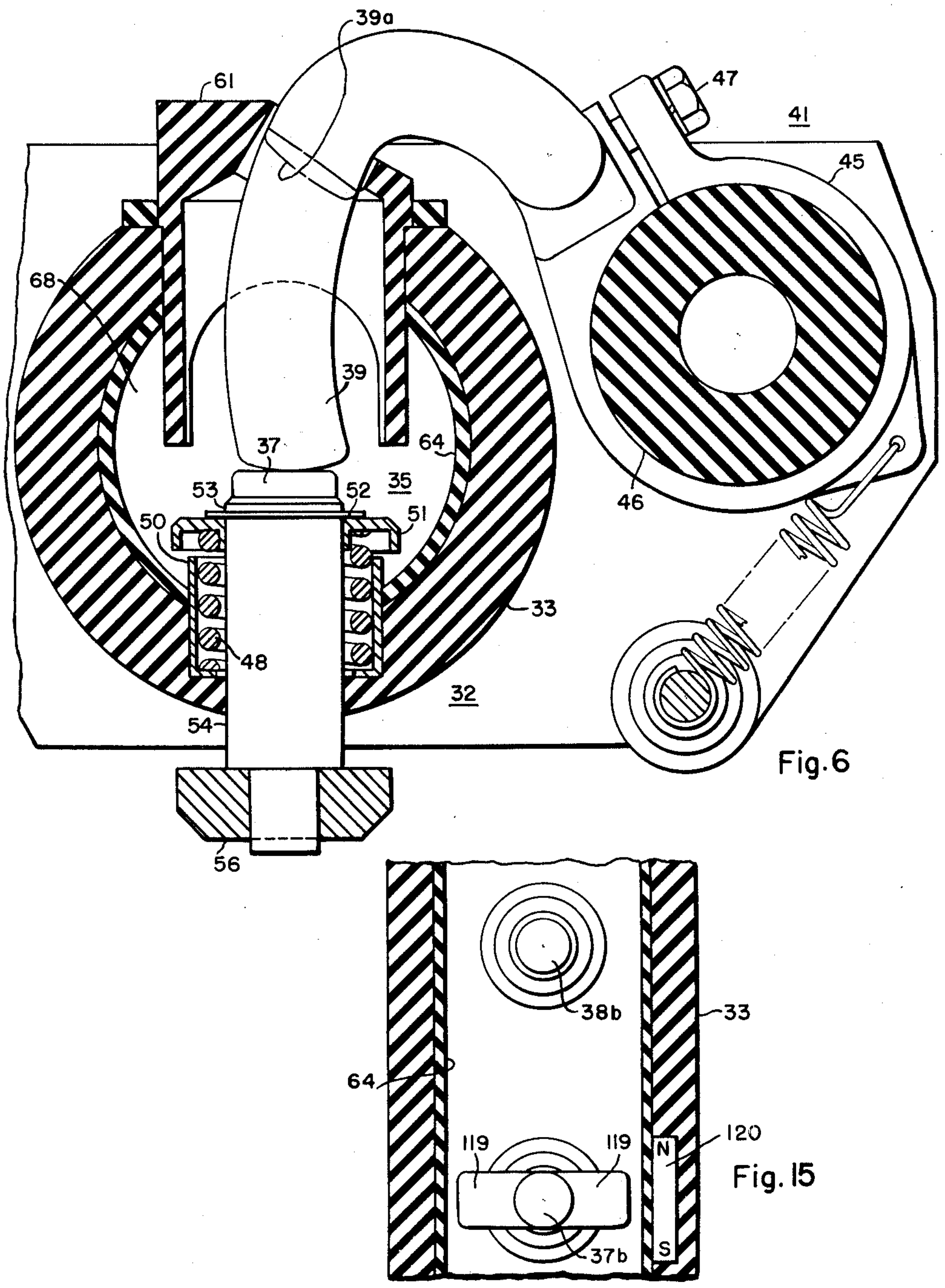
Fig. 6 is a considerably enlarged sectional view taken through the interrupting structure of Fig. 3 substantially along the line VI—VI thereof.
Fig. 15 illustrates a vertical sectional view taken substantially along the line XV—XV of Fig. 13 in which the arc-extinguishing assemblage is slightly different from that illustrated in Fig. 13.

Figs. 4 and 5 collectively illustrate how the movable rotary contact assemblage 41 is constituted by the clamping of a plurality of, in this particular instance three, U-shaped movable bridging contacts, generally designated by the reference numeral 44, to an insulating tubular shaft 46. Each U-shaped bridging contact 44 has a centrally disposed collar portion 45 integrally formed therewith and slotted, which encircles the tubular insulating operating rod 46, and is suitably clamped thereto by clamping bolts 47, as indicated in Figs. 5 and 6.

Preferably the relatively stationary pressure-generating and interrupting contacts 37, 38 are resiliently mounted by means of springs 48, 49, which are seated in spring holders 50. The relatively stationary contacts 37, 38 themselves have cooperating spring seats 51, which bear against split mounting washers 52, the latter being seated within annular grooves 53 provided on the outer surface of the stationary contacts 37, 38.

The shank portions 54, 55 of the relatively stationary contacts 37, 38 are brazed to a conducting bar 56, which electrically interconnects them, and also provides a stop for the radially inward movement of the contacts 37, 38, as brought about by the compression springs 48, 49. Thus during the closing movement, the movable contacts 39, 40 strike against the relatively stationary contacts 37, 38 and move the latter slightly to the left, as viewed in Fig. 3 and as more clearly illustrated in Fig. 6, thereby compressing the compression springs 48, 49 to bring about the requisite contact pressure.

An interrupting nozzle 57 is disposed within a side opening 58 of the insulating tube 33, and during the opening operation the interrupting arc 59 is subjected to an outward blast of fluid through the orifice 60 of the interrupting nozzle 57. Similarly associated with the movable and stationary contacts 39, 37 is a confining insulating tubular member 61, which is positioned within another side opening 62 of the insulating tube 33. The interrupting nozzle 57 and the confining tubular member 61 are fixedly maintained in position by having shoulders 63 formed therein which abut against a cylindrical lining 64, and clamping plates 65 and 66 are screwed to the side of the insulating tube 33 by fiber screws, not shown. A baffle plate 67 has its left-hand end, as viewed in Fig. 3, screwed to the clamping plate 66 prior to the assembly of the latter against the side wall of the tube 33, so that the arc gases which pass out of the orifice 60 will not move downwardly toward the movable pressure-generating contact 39, which might possibly cause flashover.

Preferably the tubular lining 64 and the end plates 68 are formed from polytetrafluoroethylene, which resists the action of gases formed in sulfur hexafluoride, which preferably is the gas enclosed within the casing 2. Also the interrupting nozzle 57 and the tubular member 61 are formed of polytetrafluoroethylene, which has the characteristic of not forming corrosion acids upon being subjected to the action of an arc in $SF_6$ gas and being resistant to the arc.

Although the invention is illustrated in connection with a sealed chamber enclosing sulfur hexafluoride gas, the use of which gas being disclosed and claimed in United States Patent 2,757,261, issued July 31, 1956, it is to be clearly understood that some features of the structure of the invention may be advantageously utilized with other gases, or fluids, or even with liquids, such as oil. However, other aspects of the invention require, for best results, the use of an arc-extinguishing gas such as $SF_6$, or gases having similar properties, such as selenium hexafluoride ($SeF_6$) claimed in United States Patent 2,733,316, or mixtures of those gases with each other, or with inert gases, such for example as helium, carbon dioxide, air, nitrogen, and argon.

Pins 69 of insulating material extending through the side walls of the insulating tube 33 assist in maintaining the plugs 34 and the insulating central spacer 70 in position.

The upper and the lower breaks of the interrupting assemblage 32 are isolated relative to the two pressure-generating chambers 35. They have considerable interrupting capacity by themselves when the circuit interrupter 1 is utilized for interrupting the leading currents associated with the switching of shunt capacitor banks, but for interrupting fault currents associated with inductive circuits, the interrupting effectiveness of the end breaks is somewhat limited.

In construction the end breaks include end stationary contacts 43 which are biased inwardly by additional compression springs 49, which have spring holders 50 and spring seats 71 associated therewith. An insulating cylindrical tube 72 substantially encloses the arcing space between the contacts 42, 43, the insulating tube 72 having a shoulder portion 73, which, in conjunction with additional clamping plates 74, maintains the tube 72 fixedly in position against the side wall of the insulating tube 33. Preferably the left-hand end of the insulating tube 72 surrounds the spring holder 50, the latter assisting in maintaining the tube 72 in the correct position.

Secured to the shank portion 75 of the end relatively stationary contact 43 is an L-shaped flexible contact strap 76, which is pressed by a compression spring 77 (Fig. 1) into good contacting engagement with the top casting cover 9. The upper insulating end cap 79 of the insulating tube 33 has a pair of metallic positioning pins 80 pinned thereto, which positioning pins 80 pass through apertures 81 provided in a positioning plate 78. The end cap 79 has an opening 82 (Fig. 3) provided therein, within which is disposed a spring cup 83 (Fig. 1) containing the compression spring 77.

Thus the flexible contact strap 76 is pressed by the positioning plate 78 under the influence of the spring 77 against a contact boss portion 84 provided on the lower face of the top casting cover 9.

Similarly another flexible strap 76 (Fig. 2) is forced by the weight of the tubular interrupting assembly 32 and also the spring 77 against the intermediate casting plate 19 so as to make good contacting engagement therewith. It will be observed that various features of the construction of the present interrupter follow a pattern similar to that utilized in the aforesaid United States Patent 2,809,259.

Also a pin 85 (Fig. 4) is secured within the upper end of the tubular insulating operating rod 46, which pin 85 likewise passes through an aperture 86 provided in the positioning plate 78 (Fig. 1) and is journalled within a bearing 87 recessed within the lower face of the top casting cover 9. The lower end of the movable tubular rod 46 is slotted and within the slot is bolted a coupling 88 by bolts 89 (Fig. 4). The coupling 88 has a flange portion 90 which seats upon a bushing 91 (Fig. 2) positioned within an aperture 92 provided in the intermediate casting plate 19.

Extending interiorly upwardly within the lower casing 21, as viewed in Fig. 2, is an insulating tubular operating rod 93, which has the opposite ends thereof slotted. Into the slots are bolted couplings 94, 95. The coupling 94 is interlocked with the lower coupling 88 of the movable contact assemblage 41. The lower coupling 95 of the insulating operating rod 93 is coupled with a drive shaft 95*a*, which has a portion 96 extending exteriorly of the support casting 31 and is rotated by an actuating lever 97. A flexible sealing sleeve 98 of rubber-like material is clamped to a bevelled portion 99 of the drive shaft 95, and the lower end of the sealing tube 98 is clamped to a bevelled portion 100 of a cover plate 101, which is secured by means not shown to the lower side of the support casting 31. As set out and claimed in United States patent application filed April 9, 1956, Serial No. 576,875, now United States Patent 2,889,434 issued June 2, 1959, to Harry J. Lingal, and assigned to the assignee of the instant application, such a sealing tube arrangement prevents the escape of gas, such as $SF_6$, out of the casing 21 axially along the drive shaft 95.

From the foregoing description it will be apparent that external actuation of the drive shaft 95 by the crank arm 97, effected by any suitable external mechanism, will through the couplings 95, 94, 88 effect corresponding rotative motion of the upper rotary movable contact assemblage 41 and hence opening or closing rotary movement of the several movable contacts 39, 40 and 42.

The contacts are preferably arranged so that a simultaneous breaking action occurs even though contact 38 is longer than stationary contact 37, resulting in the simultaneous establishment of a plurality of serially related arcs. Referring to Fig. 5, it will be observed that the movable contacts 39 are longer than movable contacts 40 and 42 to compensate for the greater length of stationary contacts 38 and 43 as compared with stationary contact 37. The pressure-generating arc 102, which is established between the contacts 37, 39 in each pressure-generating chamber 35 will heat the gas within the pressure-generating chamber 35, and, because of the inwardly extending shield portion 103 of the tubular member 61, will cause relatively cool gas to flow out through the orifice 60 against the interrupting arc 59. This occurs because the shield portion 103 prevents direct flow of hot gases against the interrupting arc 59 and insures a long length of travel of the gases, during which time they are cooled, before they contact the interrupting arc 59. The fully open position of the movable pressure-generating contact 39 is indicated by the dotted lines 39*a* in Figs. 3 and 6; consequently, the opening 39*b* of the tubular member 61 is always closed, thereby compelling the gases to exhaust out the orifice opening 60 against the interrupting arc 59.

Figure 7:
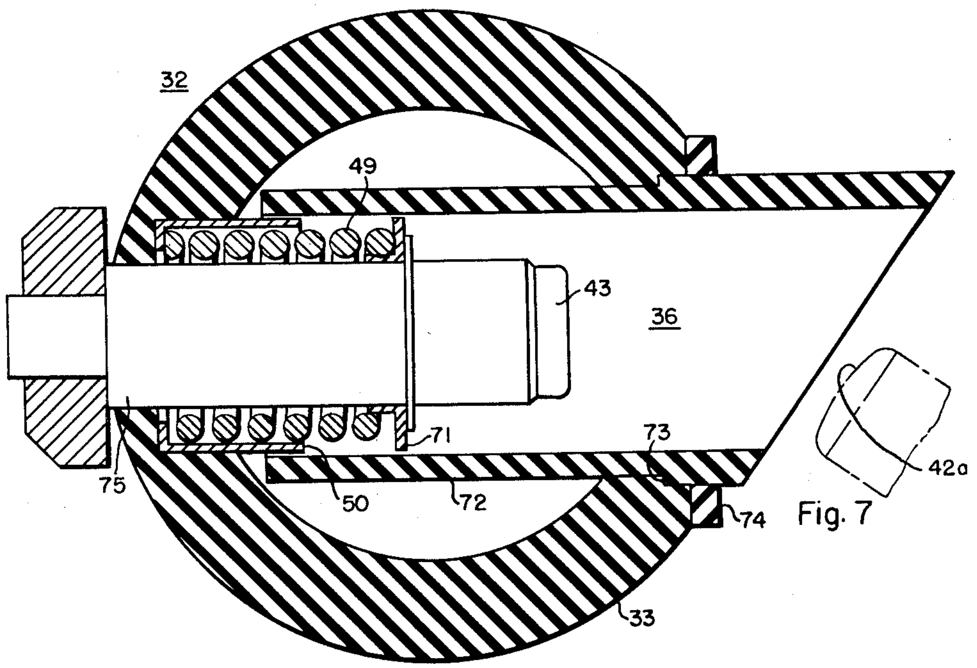
Fig. 7 is a similar view taken through one of the isolated contact structures of Fig. 3, substantially along the line VII—VII thereof.
Figure 8:
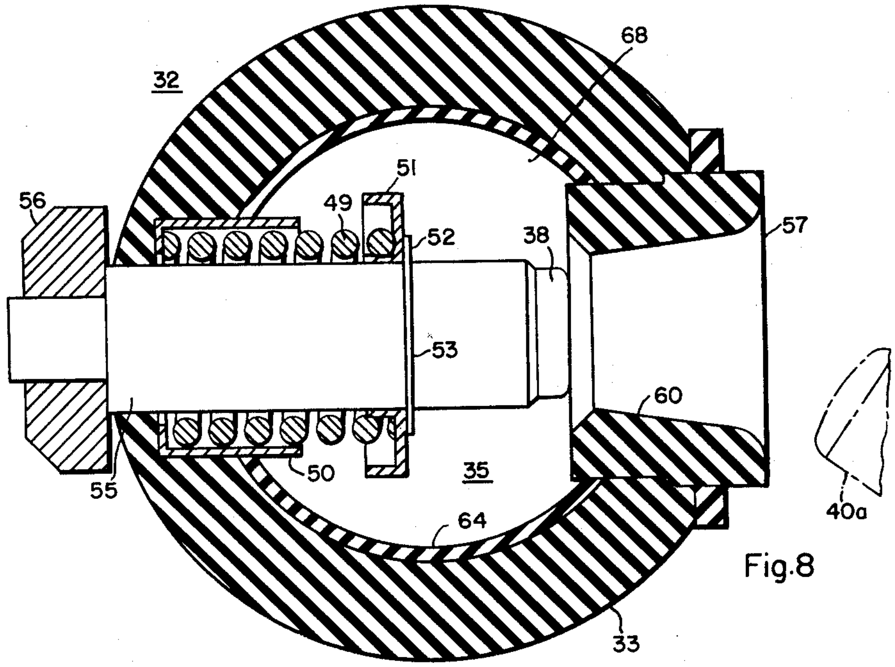
Fig. 8 is another similarly enlarged sectional view taken substantially along the line VIII—VIII of Fig. 3.

This action takes place in both pressure-generating chambers 35 with the movable interrupting contacts 40 moving to the fully open position, indicated by the dotted lines 40*a* in Figs. 3 and 8. At the same time the isolated end breaks disposed in the end chambers 36 cause some pressure to be developed within the cylindrical tubes 72, and this gas under pressure is ejected from the open ends of the two tubes 72, thereby providing additional interrupting effectiveness at the end breaks, where the arcs 104 are established. The fully open position of the end breaks is indicated by the dotted lines 42*a* in Figs. 3 and 7. Since the contacts are all connected in series the extinction of any one arc will interrupt the circuit. Continued rotative travel of the movable contact assemblage 41 to the fully open positions 39*a*, 40*a* and 42*a* of the several contacts will bring about a plurality of isolating contact gaps, thereby eliminating the necessity for providing an external disconnecting switch. In other words, the several isolating gaps in the open position of the interrupter are fully adequate to hold the voltage.

For certain applications it may be desirable to utilize a piston wing construction of the general type disclosed in the aforesaid patent by Benjamin P. Baker, Charles F. Cromer and Joseph Sucha. Figs. 9–12 illustrate an arrangement in which a piston wing 105, secured by a plurality of bolts 106 to the rotary movable contact assemblage 107, is employed to force fluid, such as gas, from a piston chamber 108 (Fig. 12) through a plurality of valve-controlled openings 109 into the pressure-generating chambers 35*a*. The U-shaped movable bridging contacts 44 may be the same as utilized heretofore and the construction of the pressure-generating chambers 35*a* may be similar to that heretofore described.

Figures 9, 10, 11:
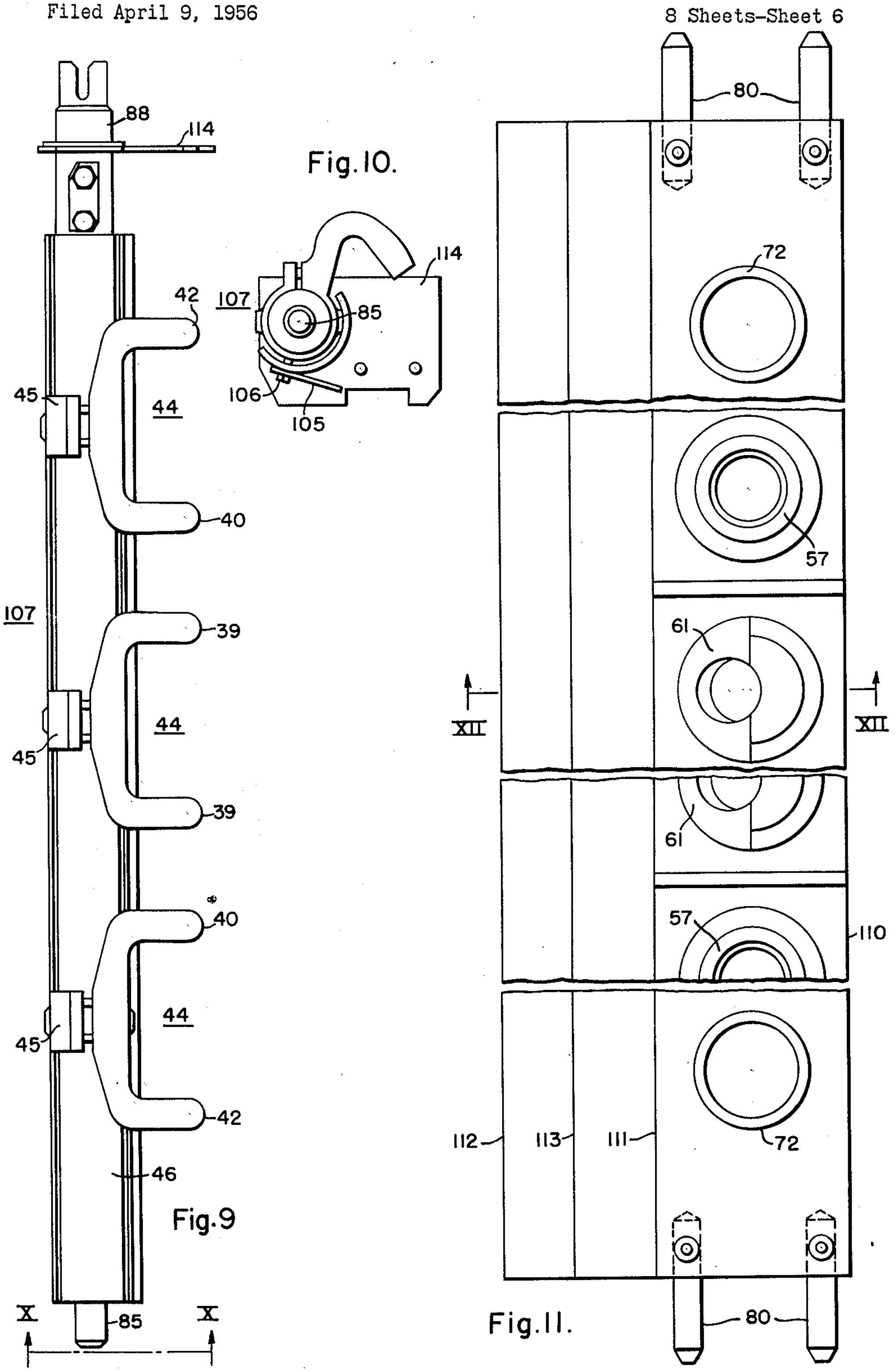
Fig. 9 illustrates a modified type of rotary movable contact assemblage, in which a piston wing is secured to the rotary elements for providing piston action.
Fig. 10 is an end view of the rotary movable contact assemblage of Fig. 9 taken substantially along the line X—X thereof looking in the direction of the arrows.
Fig. 11 is a side elevational view of the interrupting structure of a modified type of circuit interrupter, utilizing the piston construction and the rotary movable contact assemblage of Figs. 9 and 10.
Figure 12:
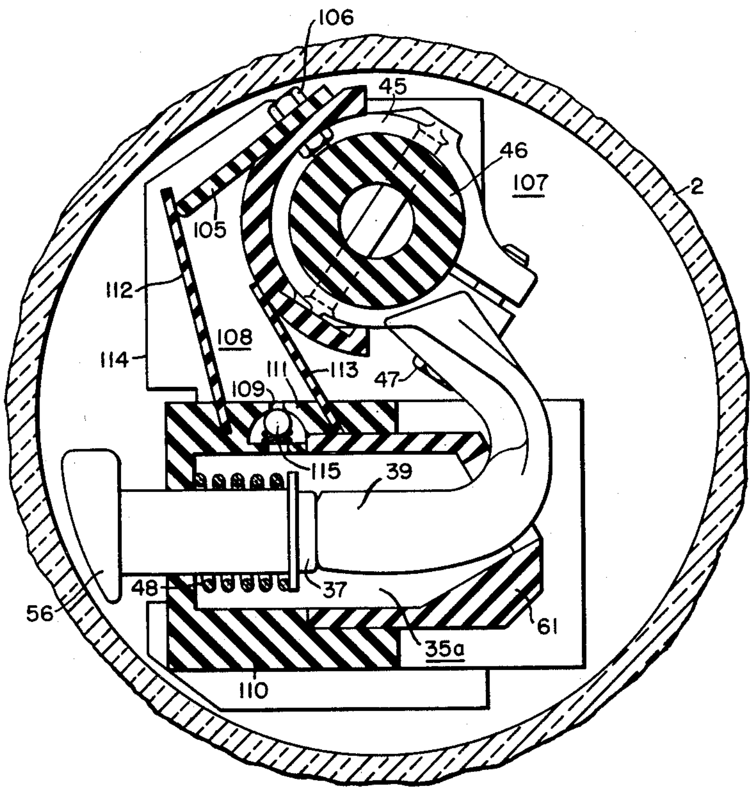
Fig. 12 is an enlarged sectional view taken substantially along the line XII—XII of Fig. 11, but also indicating the location of the movable contact assemblage, with its associated piston construction, and a fragmentary portion of the surrounding casing.

Instead of using an insulating tube 33, in the construction of Figs. 11 and 12, an insulating bar 110 is employed having suitable openings provided therein. Jutting laterally from the upper side wall 111 of the insulating bar or support 110 are a pair of insulating plates 112, 113, which, in conjunction with the end positioning plates 114 (Fig. 10) provide the piston chamber 108 (Fig. 12). Thus rotary movement of the movable contact assemblage 107 will move the piston wing 105 in an arc, compressing the gas within the piston chamber 108, and forcing it through the openings 109 when the pressure within the pressure-generating chambers 35*a* is less than that generated in the piston chamber 108. This will, of course, occur only during the interruption of relatively low currents.

For the interruption of relatively high currents, the pressure within the pressure-generating chambers 35*a* will be considerably greater and will maintain the valve 115 closed over its opening, thereby preventing the entrance of compressed gas from the piston chamber 108 into the chambers 35*a*. The end breaks in such a modified construction may also have the piston action available, the end breaks then being provided with openings 109.

Figures 13, 14:
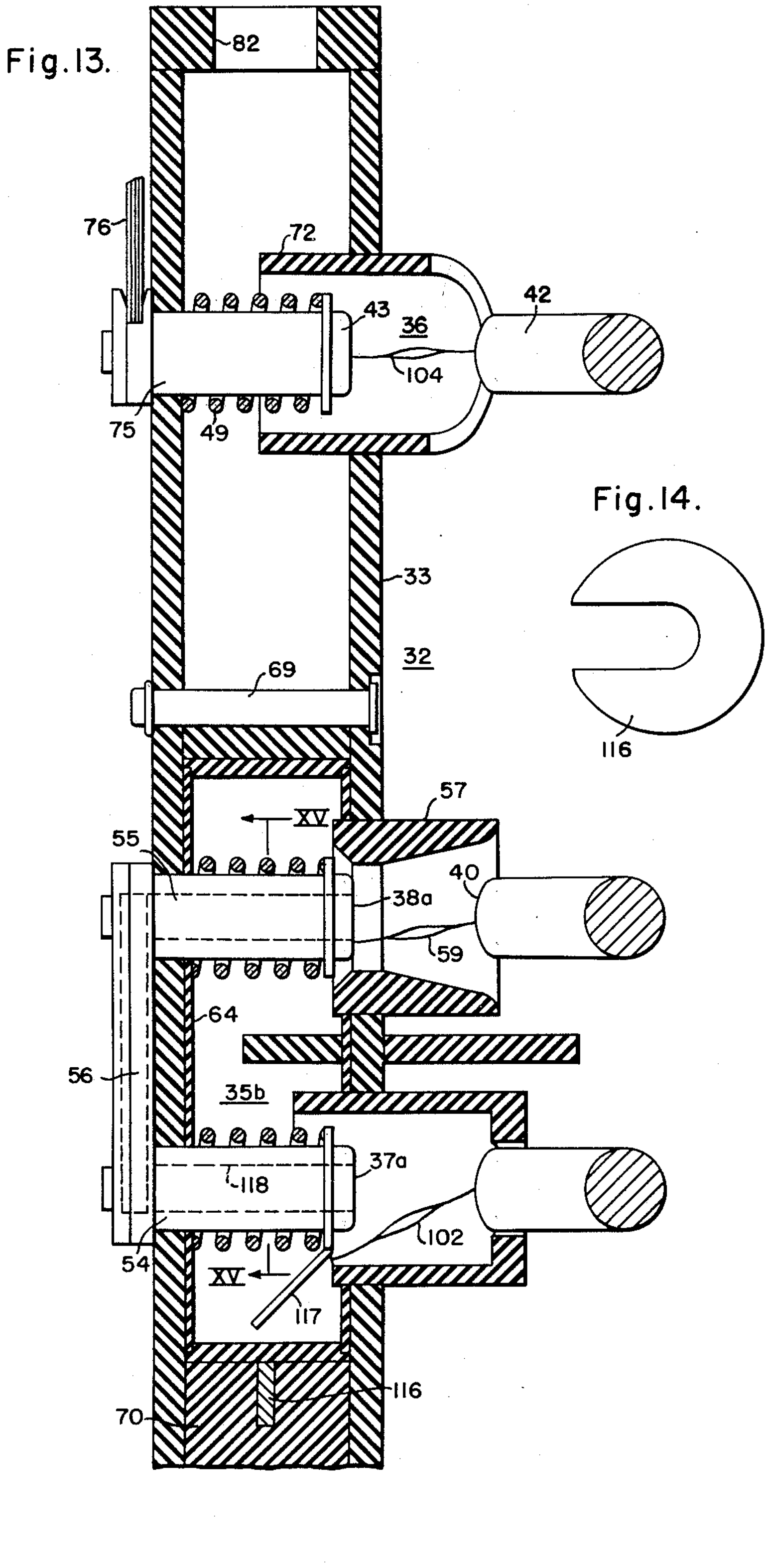
Fig. 13 is a vertical sectional view taken through a modified type of arc-extinguishing structure in which the construction of the pressure-generating chamber is modified from that illustrated in Fig. 3.
Fig. 14 illustrates a top plan view of an iron plate utilized in the modified type of arc-extinguishing assemblage illustrated in Fig. 13.

In the modified type of pressure-generating chamber 35*b* illustrated in Fig. 13, a horseshoe-shaped magnetic plate 116, preferably of iron, is disposed laterally of an arcing horn 117 associated with the relatively stationary pressure-generating contact 37*a*. The effect of the iron plate 116 is to move the pressure-generating arc 102 laterally out along the arc horn 117 during relatively high values of arcing current so as to increase the length thereof and hence the pressure produced thereat. This will intensify the generation of pressure during the interruption of high values of current.

It will be noted that in addition the relatively stationary pressure-generating contact 37*a* has a passage 118 provided therethrough. This passage 118 also traverses the conducting bar 56 and the interrupting contact 38*a*. The passage 118 assists the fluid in passing toward the nozzle 57 and facilitates arc interruption. Other features of this modified type of arc-extinguishing structure may be the same as heretofore described in connection with Fig. 3 of the drawings.

Fig. 15 fragmentarily illustrates a sectional view taken along lines XV—XV of Fig. 13 with the structure slightly varied to eliminate the passage 118 and to reorient the arcing horn 117 to a new position at right angles thereto. In other words, the arcing horn 119 extends laterally from the relatively stationary pressure-generating contact 37*b* so that the arc drawn thereat will be magnetically affected by a bar permanent magnet 120. Thus, depending upon the instantaneous direction of current flow and the magnitude of the instantaneous current, the arc will be biased to one end or the other end of the arcing horn 119 so as to increase the pressure formed thereat.

From the foregoing description of several features of the invention, it will be apparent that improved interrupting performance may be obtained in the present interrupter over the circuit interrupter set out in the aforesaid United States Patent 2,809,259. Although the interrupting ability of the circuit interrupter of this patent on fault current interruption could be increased by the use of a larger-sized puffer, the interrupting effect does not appear to be linear, and the operating force required and resultant cost decreased the attractiveness of the interrupter of this patent for the higher kva. ratings. By utilizing pressure-generating chambers utilizing pressure and interrupting arcs the interrupting effectiveness of the device described herein is considerably increased on inductive loads. To interrupt capacitive loads with the higher voltages there was formerly required either excessive contact speed or a large number of breaks in series. When interrupting inductive loads, fewer breaks are required, but more deionizing effort must be utilized, especially at the higher values of current. The most economical all-purpose interrupter disclosed herein, therefore, consists of one or more simple well-insulated gaps, as at the ends of the device, to assist in interrupting leading currents, in series with the several more potent interrupters utilizing gas flow under pressure for handling the lagging currents. Since the interrupting effort required for interrupting large values of current is greater than that for interrupting low values of current, by utilizing a series pressure-generating arc, the desired result is achieved, since the interrupting effort is derived from the fault current itself. This effort is therefore proportional to the current interrupted.

If desired, as shown in Figs. 1 and 2, two capacitors 121, 122 of the tubular type enclosing stacked ceramic capacitance elements may be utilized to divide the voltage between the several breaks, the intermediate tap on the capacitors being provided by a tension spring 123 to the midpoint of the movable contact assemblage 41. The end connections 124, 125 of the capacitors 121, 122 are connected to the plate portions 12 and 12' respectively. The use of such elements is claimed in United States patent application filed December 20, 1954, Serial No. 476,108, now United States Patent 2,840,670, issued June 24, 1958, to Winthrop M. Leeds, Benjamin P. Baker and Robert E. Friedrich and assigned to the assignee of the instant application.

Test results of a type of interrupter as constructed according to Figs. 1–8 show that it is capable of successfully interrupting capacitive loads and inductive loads in excess of one and one-half million kva. at 138 kv.

Certain features of this disclosure are described and claimed in United States patent application filed March 14, 1956, Serial No. 571,535, now United States Patent 2,913,556, issued November 17, 1959, to Winthrop M. Leeds and assigned to the assignee of the instant application.

Although there have been shown and described specific structures, it is to be clearly understood that the same were merely for the purpose of illustration, and that changes and modifications may readily be made therein by those skilled in the art, without departing from the spirit and scope of the invention.

I claim as my invention:

1. The combination in a fluid-blast circuit interrupter of an elongated insulating cylindrical casing, an elongated insulating support member removably positioned longitudinally within said elongated casing for defining a substantially enclosed pressure-generating chamber immersed in an arc-extinguishing fluid, only a pair of spaced openings being provided in one wall of said substantially enclosed pressure-generating chamber, a pair of spaced relatively stationary contacts supported within said pressure-generating chamber on a side wall thereof which is opposite said one wall of the pressure-generating chamber, an elongated rotatable contact assemblage disposed interiorly within said elongated casing and having an axis of rotation substantially parallel to said elongated insulating removable support member, the elongated rotatable contact assemblage carrying a pair of spaced elongated movable contacts movable within said pair of openings and interiorly across the pressure-generating chamber to engage said pair of spaced relatively stationary contacts in the closed position of the interrupter, connecting means for electrically connecting the two pairs of separable contacts in series so that two serially related arcs are established during the opening operation within the interior of said pressure-generating chamber to establish fluid pressure therein, one of said elongated movable contacts blocking its respective opening in the wall of the pressure-generating chamber during opening whereas the other elongated movable contact clears its respective opening so that the stored-up generated fluid pressure within the pressure-generating chamber is released out through the cleared opening to extinguish the arc extended therethrough.

2. A circuit interrupter of the fluid-blast type including means defining a substantially enclosed pressure-generating chamber, a pair of spaced openings in one wall of said pressure-generating chamber, a pair of spaced relatively stationary contacts positioned within said substantially enclosed pressure-generating chamber upon an opposite side wall thereof, a pair of spaced rod-like movable contacts movable within said spaced openings and across the interior of said pressure-generating chamber into engagement with said spaced pair of relatively stationary contacts, a third relatively stationary contact spaced away from the first said pair of relatively stationary contacts and disposed externally of said pressure-generating chamber, a third movable contact cooperable with said third relatively stationary contact externally of said pressure-generating chamber, connecting means for electrically connecting the three pairs of separable contacts in series electrically so that three serially related arcs are established two of which are drawn interiorly of said pressure-generating chamber and one exteriorly thereof, and one of the pair of movable contacts blocking its respective opening so that the stored-up generated fluid pressure within said substantially enclosed pressure-generating chamber may be released out through the other opening into engagement with the arc drawn therethrough.

3. The combination in a fluid-blast circuit interrupter of a rotatable movable contact assemblage carrying at least three movable contacts, means defining a substantially enclosed pressure-generating chamber having two openings in a side wall thereof, a pair of relatively stationary contacts disposed within the pressure-generating chamber and mounted upon an opposite side wall thereof, a third relatively stationary contact positioned outside of the pressure-generating chamber, the three movable contacts being separable away from the three relatively stationary contacts to establish three arcs, means connecting the contacts in series so that the three arcs are serially related, and an interrupting nozzle associated with one of the openings in the side wall of the pressure-generating chamber adjacent which one of the arcs is established to receive a fluid blast from built-up fluid pressure out of the pressure-generating chamber.

4. A circuit interrupter including an elongated insulating support, three relatively stationary contacts mounted upon said elongated support, a rotatable movable contact assemblage having an axis of rotation generally parallel to the axis of said elongated insulating support, at least three rotatable contacts carried by the rotatable contact assemblage, means defining a substantially enclosed pressure-generating chamber enclosing two of the three relatively stationary contacts and having a pair of openings in a side wall thereof, two of the three rotatable contacts being movable through the pair of openings into the interior of said pressure-generating chamber and into engagement with the two relatively stationary contacts disposed within the pressure-generating chamber and mounted upon an opposite side wall thereof, the third movable contact being engageable with the third relatively stationary contact, and means electrically connecting all of the contacts in series.

5. A circuit interrupter including an elongated insulating support, three relatively stationary contacts mounted upon said elongated support, a rotatable movable contact assemblage having an axis of rotation generally parallel to the axis of said elongated insulating support, at least three rotatable contacts carried by the rotatable contact assemblage, means defining a substantially enclosed pressure-generating chamber enclosing two of the three relatively stationary contacts and having a pair of openings in a side wall thereof, two of the three rotatable contacts being movable through the pair of openings into the interior of said pressure-generating chamber and into engagement with the two relatively stationary contacts disposed within the pressure-generating chamber and mounted upon an opposite side wall thereof, the third movable contact being engageable with the third relatively stationary contact, means electrically connecting all of the contacts in series, and a confining insulating shield disposed about the third movable and third relatively stationary contacts.

6. A circuit interrupter of the fluid-blast type including an elongated insulating interrupting tube, means blocking up one or more portions of the interrupting tube to define one or more substantially enclosed pressure-generating chambers therein, a pair of relatively stationary contacts positioned in each pressure-generating chamber on one side wall thereof, a pair of side openings for each pressure-generating chamber in an opposite side wall of the pressure-generating chamber, a third relatively stationary contact isolated from the pressure-generating chamber and supported by the interrupting tube, a rotary contact assembly carrying a plurality of rotative contacts, two of the rotative contacts making engagement through the pair of side openings with a pair of relatively stationary contacts positioned within the pressure-generating chamber on said opposite side wall thereof, the arc drawn by one of said two rotative movable contacts generating pressure to effect extinction of the other arc drawn at the other of the two rotative contacts, a third rotative contact making engagement with the isolated relatively stationary contact, and means electrically connecting the contacts in series.

7. A circuit interrupter of the fluid-blast type including an elongated sealed casing containing a sealed-in fluid, an elongated insulating interrupting tube extending generally parallel to the axis of the casing, means blocking up one or more portions of the interrupting tube to define one or more substantially enclosed pressure-generating chambers therein, a pair of relatively stationary contacts positioned in each pressure-generating chamber on one side wall thereof, a pair of side openings in an opposite side wall for each pressure-generating chamber, a third relatively stationary contact isolated from the pressure-generating chamber and supported by the interrupting tube, a rotary contact assembly carrying a plurality of rotative contacts, the rotary contact assembly being rotative about an axis generally parallel to the axis of the casing, two of the rotative contacts making engagement through the pair of side openings and across the interior of the pressure-generating chamber with the pair of relatively stationary contacts positioned within the pressure-generating chamber, the arc drawn by one of said two rotative movable contacts generating pressure to effect extinction of the other arc drawn at the other of the two rotative contacts, a third rotative contact making engagement with the isolated relatively stationary contact, and means electrically connecting the contacts in series.

8. A circuit interrupter of the fluid-blast type including a single substantially enclosed pressure-generating chamber, a pair of tubular relatively stationary contacts disposed within the single pressure-generating chamber on one interior side wall thereof, a tubular connector electrically connecting the pair of relatively stationary contacts in series, a pair of movable contacts movable through a pair of openings in an opposite external wall of the pressure-generating chamber and making contacting engagement with the pair of relatively stationary contacts and the combined pressure from both arcs building up pressure to exhaust out one side opening to extinguish arcing.

9. A circuit interrupter of the fluid-blast type including a single pressure-generating chamber, a pair of tubular relatively stationary contacts disposed within the single pressure-generating chamber upon one internal side wall thereof, a tubular connector electrically connecting the pair of relatively stationary contacts in series, a pair of openings in the opposite side wall of the pressure-generating chamber, an interrupting orifice disposed in one of the openings, a pair of simultaneously movable contacts movable through said pair of openings and making contacting engagement with the pair of relatively stationary contacts, the movable contacts being separable from the pair of relatively stationary contacts to establish a pair of serially related arcs within said single pressure-generating chamber, and means confining one of the arcs so that it will generate pressure within the pressure-generating chamber and force a blast of fluid out through said interrupting orifice to extinguish the arc drawn adjacent thereto.

10. A circuit interrupter including means defining a pressure-generating chamber, a pair of relatively stationary contacts disposed within said pressure-generating chamber along one side wall thereof, a pair of apertures disposed in the opposite side wall of said pressure-generating chamber, a pair of movable contacts movable in the same direction during opening and closing through the apertures and across the interior of the pressure-generating chamber into engagement with the pair of relatively stationary contacts, means for effecting the simultaneous movement of the pair of movable contacts, conducting means for connecting all the contacts in series electrically, an arcing horn associated with one of the relatively stationary contacts, magnetic means for lengthening the arc on the arcing horn during high-current interruption, and the movable contact cooperating with said one stationary contact blocking its opening during the opening operation whereas the other movable contact clears its respective opening for exhausting the pressure.

11. A circuit interrupter including means defining a pressure-generating chamber, a pair of relatively stationary contacts disposed within said pressure-generating chamber along one side wall thereof, a pair of apertures disposed in the opposite side wall of said pressure-generating chamber, a pair of movable contacts movable in the same direction during opening and closing through the apertures and across the interior of the pressure-generating chamber into engagement with the pair of relatively stationary contacts, means for effecting the simultaneous movement of the pair of movable contacts, conducting means for connecting all of the contacts in series electrically, an arcing horn associated with one of the relatively stationary contacts to effect arc lengthening thereat during high-current interruption, and the movable contact cooperating with said one stationary contact blocking its opening during the opening operation whereas the other movable contact clears its respective opening for exhausting the pressure.

12. A circuit interrupter including means defining a pressure-generating chamber, a pair of relatively stationary contacts disposed within said pressure-generating chamber along one side wall thereof, a pair of apertures disposed in the opposite side wall of said pressure-generating chamber, a pair of movable contacts movable in the same direction during opening and closing through the apertures and across the interior of the pressure-generating chamber into engagement with the pair of relatively stationary contacts, means for effecting the simultaneous movement of the pair of movable contacts, conducting means for connecting all the contacts in series electrically, an arcing horn associated with one of the relatively stationary contacts, magnetic means including a magnetic horseshoe-shaped member for lengthening the arc on the arcing horn during high-current interruption, and the movable contact cooperating with said one stationary contact blocking its opening during the opening operation whereas the other movable contact clears its respective opening for exhausting the pressure.

13. A circuit interrupter including means defining a pressure-generating chamber, a pair of relatively stationary contacts disposed within said pressure-generating chamber along one side wall thereof, a pair of apertures disposed in the opposite side wall of said pressure-generating chamber, a pair of movable contacts movable in the same direction during opening and closing through the apertures and across the interior of the pressure-generating chamber into engagement with the pair of relatively stationary contacts, means for effecting the simultaneous movement of the pair of movable contacts, conducting means for connecting all the contacts in series electrically, an arcing horn associated with one of the relatively stationary contacts, magnetic means including a bar-shaped permanent magnet for lengthening the arc on the arcing horn during high-current interruption, and the movable contact cooperating with said one stationary contact blocking its opening during the opening operation whereas the other movable contact clears its respective opening for exhausting the pressure.

14. The combination in a fluid-blast circuit interrupter of a rotatable movable contact assemblage carrying at least three movable contacts and a movable piston wing, means defining a pressure-generating chamber having two openings in a side wall thereof, a pair of relatively stationary contacts disposed within the pressure-generating chamber, a third relatively stationary contact positioned outside of the pressure-generating chamber, the three movable contacts being separable away from the three relatively stationary contacts to establish three arcs, means connecting the contacts in series so that the three arcs are serially related, an interrupting nozzle associated with one of the openings in the side wall of the pressure-generating chamber adjacent which one of the arcs is established to receive a fluid blast out of the pressure-generating chamber, another opening in a side wall of said pressure-generating chamber, and the piston wing forcing fluid to flow under pressure through the last-mentioned opening into the pressure-generating chamber to facilitate low-current interruptions.

15. The combination in a fluid-blast circuit interrupter of a rotatable movable contact assemblage carrying at least three movable contacts and a movable piston wing, means defining a pressure-generating chamber having two openings in a side wall thereof, a pair of relatively stationary contacts disposed within the pressure-generating chamber, a third relatively stationary contact positioned outside of the pressure-generating chamber, the three movable contacts being separable away from the three relatively stationary contacts to establish three arcs, means connecting the contacts in series so that the three arcs are serially related, an interrupting nozzle associated with one of the openings in the side wall of the pressure-generating chamber adjacent which one of the arcs is established to receive a fluid blast out of the pressure-generating chamber, another opening in a side wall of said pressure-generating chamber, the piston wing forcing fluid to flow under pressure through the last-mentioned opening into the pressure-generating chamber to facilitate low-current interruptions, and valve means controlling the last-mentioned opening to prevent reverse flow through the valve controlled opening during high-current interruption.

16. A circuit interrupter including an elongated insulating casing, means including an elongated insulating support member removably positioned within said casing for defining a substantially enclosed pressure-generating chamber, a pair of relatively stationary contacts disposed within said pressure-generating chamber mounted upon one interior side wall thereof, a pair of apertures disposed in the opposite side wall of said pressure-generating chamber, an elongated rotatable contact assemblage disposed interiorly within said casing and having an axis of rotation substantially parallel to said elongated insulating support member, the elongated rotatable contact assemblage carrying a pair of movable contacts movable through the apertures and across the interior of the pressure-generating chamber into engagement with the pair of relatively stationary contacts, said rotatable contact assemblage effecting the simultaneous movement of the pair of movable contacts, relatively stationary means for electrically connecting the pair of relatively stationary contacts together, means insulating the pair of movable contacts from each other, and one movable contact being in the aperture associated therewith when the other movable contact clears its associated aperture to cause a flow of gas from said substantially enclosed pressure-generating chamber out of the aperture cleared by its associated movable contact.

17. A circuit interrupter of the fluid-blast type including means defining a substantially enclosed pressure-generating chamber, a pair of relatively stationary contacts positioned within said pressure-generating chamber upon one interior side wall thereof, a pair of spaced apertures disposed in the opposite side wall of the pressure-generating chamber, a third relatively stationary contact spaced away from the first said pair of relatively stationary contacts and outside of the pressure-generating chamber, three movable contacts separable away from the three relatively stationary contacts to establish three arcs, means electrically connecting all of the contacts in series so that the three arcs are serially related, two of the three movable contacts movable within said spaced apertures and into the interior of said pressure-generating chamber during the opening operation, and one movable contact being in the aperture associated therewith when the other movable contact clears its associated aperture to cause a flow of fluid from said pressure-generating chamber out of the aperture cleared by its associated movable contact.

18. A circuit interrupter including an elongated insulating support, three relatively stationary contacts mounted upon said elongated support, a rotatable movable contact assemblage having an axis of rotation generally parallel to the axis of said elongated insulating support, at least three rotatable contacts carried by the rotatable contact assemblage, means defining a substantially enclosed pressure-generating chamber enclosing two of the three relatively stationary contacts and having a pair of openings in an external side wall thereof, two of the three rotatable contacts being movable through the pair of openings into the interior of said pressure-generating chamber and into engagement with the two relatively stationary contacts disposed within the pressure-generating chamber upon an opposite internal side wall thereof, the third movable contact being engageable with the third relatively stationary contact, means electrically connecting all of the contacts in series, and one movable contact being in the opening associated therewith substantially blocking the same when the other movable contact clears its associated opening to cause a flow of fluid from said pressure-generating chamber out of the opening cleared by its associated movable contact.

19. The combination in a circuit interrupter of an elongated insulating cylindrical casing, a rotatable movable contact assembly having an axis of rotation generally parallel to the axis of said cylindrical casing, one or more U-shaped bridging members having hooked contacting ends carried by the rotatable contact assembly, one or more substantially enclosed arc-extinguishing units disposed interiorly of the casing, each arc-extinguishing unit having two relatively stationary contacts disposed therewithin on an interior side wall thereof, a pair of apertures disposed in an opposite external side wall of at least one arc-extinguishing unit through which a pair of movable contacts carried by the rotatable movable contact assembly move and engage with the two relatively stationary contacts, means connecting the pairs of separable contacts in series electrically, and one movable contact being in the aperture associated therewith when the other movable contact clears its associated aperture to cause a flow of gas from said pressure-generating chamber out of the aperture cleared by its associated movable contact.

20. A circuit interrupter of the fluid-blast type including a substantially enclosed pressure-generating chamber having a pair of apertures in a side wall thereof, a pair of relatively stationary contacts located within the pressure-generating chamber upon an opposite interior side wall thereof, a pair of movable contacts movable within the apertures and into the interior of said pressure-generating chamber and making separable engagement with the pair of relatively stationary contacts, an interrupting orifice disposed in one aperture, a shielding orifice disposed in the other aperture having a shielding portion at least partially preventing direct flow of hot fluid through the interrupting orifice, and the movable contact associated with the shielding orifice blocking the opening therethrough during the opening operation so that a blast of fluid flows out of the pressure-generating chamber against the arc drawn through the interrupting orifice.

21. A circuit interrupter including an elongated insulating cylindrical casing, an elongated insulating support member removably positioned within said casing for defining a substantially closed pressure-generating chamber, a pair of relatively stationary contacts disposed within said pressure-generating chamber upon an interior side wall thereof, relatively stationary means for electrically connecting said pair of relatively stationary contacts in series relation, a pair of apertures disposed in the opposite side wall of said substantially closed pressure-generating chamber, a pair of elongated movable contacts movable through said apertures and across the interior of the pressure-generating chamber into contacting engagement with said pair of relatively stationary contacts, said pair of movable contacts being cooperable with the relatively stationary contacts to establish two arcs within the pressure-generating chamber, means insulating said pair of movable contacts from each other, means for effecting the simultaneous movement of said pair of movable contacts during the opening and closing operations, and one of said movable contacts blocking its aperture whereas the other movable contact clears its aperture so that the arc associated with said other movable contact is drawn through the aperture and is subjected to an extinguishing blast of fluid out through the aperture.

22. The combination in a fluid-blast circuit interrupter of an elongated insulating cylindrical casing, an elongated insulating support member removably positioned longitudinally within said elongated casing for defining a substantially enclosed pressure-generating chamber immersed in an arc-extinguishing fluid, only a pair of spaced openings in one wall of said substantially enclosed pressure-generating chamber, an insulating interrupting nozzle supported in one of said openings, a pair of spaced relatively stationary contacts supported within said pressure-generating chamber on a side wall thereof which is opposite said one wall of the pressure-generating chamber, an elongated rotatable contact assemblage disposed interiorly within said elongated casing and having an axis of rotation substantially parallel to said elongated insulating removable support member, the elongated rotatable contact assemblage carrying a pair of spaced elongated movable contacts movable simultaneously within said pair of openings and interiorly across the pressure-generating chamber to engage said pair of spaced relatively stationary contacts in the closed position of the interrupter, connecting means for electrically connecting the two pairs of separable contacts in series so that two serially related arcs are established during the opening operation within the interior of said pressure-generating chamber to establish fluid pressure therein, one of said elongated movable contacts blocking its respective opening in the wall of the pressure-generating chamber during opening whereas the other elongated movable contact clears said insulating interrupting nozzle so that the stored-up generated fluid pressure within the pressure-generating chamber is released out through the nozzle to extinguish the arc extended therethrough.

References Cited in the file of this patent

UNITED STATES PATENTS

| | | |
|---|---|---|
| 1,113,087 | Ball | Oct. 6, 1914 |
| 1,805,497 | Paul | May 19, 1931 |
| 1,934,454 | Spurgeon | Nov. 7, 1933 |
| 1,949,258 | Paul | Feb. 27, 1934 |
| 1,984,035 | Schwager | Dec. 11, 1934 |
| 2,192,772 | MacNeill | Mar. 5, 1940 |
| 2,223,901 | Scarpa | Dec. 3, 1940 |
| 2,465,240 | Leeds | Mar. 22, 1949 |
| 2,467,788 | Van Sickle | Apr. 19, 1949 |
| 2,748,227 | Caton | May 29, 1956 |

FOREIGN PATENTS

| | | |
|---|---|---|
| 712,824 | France | Aug. 3, 1931 |
| 749,949 | France | May 15, 1933 |
| 588,292 | Germany | Nov. 15, 1933 |
| 591,734 | Germany | Jan. 26, 1934 |
| 413,751 | Great Britain | July 26, 1934 |
| 599,908 | Germany | July 11, 1934 |
| 809,068 | France | Dec. 3, 1936 |
| 648,635 | Germany | Aug. 6, 1937 |